Patented Nov. 11, 1952

2,617,728

UNITED STATES PATENT OFFICE 2,617,728

RECOVERY OF VALUES FROM WASTE CANTALOUPE

George R. Van Atta, Sebastopol, Calif., assignor to the United States of America as represented by the Secretary of Agriculture No Drawing. Application March 14, 1951, Serial No. 215,619

5 Claims. (Cl. 99—2)

(Granted under the act of March 3, 1883, as amended April 30, 1928; 370 O. G. 757)

The invention herein described may be manufactured and used by or for the Government of the United States of America for govenmental purposes throughout the world without the payment to me of any royalty thereon.

This invention relates to the utilization of cull cantaloupes which are discarded in packaging and preparing this fruit for the market. In particular, the invention relates to and has among its objects treating the waste cantaloupes whereby this material can be readily separated as by filtration or pressing into a useful solid fraction and useful juice fraction. The solid fraction contains minerals and carbohydrates and can be easily dried and used as an animal feed. The juice fraction is a clear, straw yellow to amber solution containing sugars in such amounts that it can be used for many purposes and is free from condensable pectinaceous or other colloid substances. For example, the juice fraction can be used as a nutrient medium for the culture of yeast or other microorganisms. Further, it can be concentrated by evaporation to produce a molasses which can be used in animal feeds, human foods, or which can be utilized for preparing microbiological culture media. The molasses produced in this manner has a higher ratio of sugar to total solids than does beet or cane molasses and hence is a valuable carbohydrate source.

Attempts have been made in the past utilize waste cantaloupes, particularly by drying them for cattle feed. Such a procedure is not efficient because the melons contain a high percentage of water and possess a high ratio of soluble to insoluble solids. The soluble solids are, moreover, largely sugars. For these reasons it is evident that direct drying is costly and difficult.

In the following table is given the analysis of a typical lot of cantaloupes:

Analysis of cantaloupes

| Constituent | Proportion (dry weight basis) Percent | Proportion (fresh fruit basis) Percent |
|---|---|---|
| Water | 0 | 88.9 |
| Ash | 8.1 | 0.90 |
| Crude fiber | 9.3 | 1.03 |
| Ether-extractable material | 2.3 | 0.26 |
| Protein (N×6.25) | 11.4 | 1.25 |
| Reducing sugars as dextrose | 21.7 | 2.41 |
| Non-reducing sugars as dextrose | 28.8 | 3.20 |
| Pectin | 2.3 | .25 |

The separation of the cantaloupe waste into its solid and juice fractions by mechanical methods is also a difficult and unsatisfactory method. When the waste is ground to put it in condition for the separating operations it forms a viscous slimy mass containing fine particles of cellular material. Direct filtration or pressing of this material is very inefficient. When filtration or pressing is attempted to separate the juice from the solids, the fine particles of cellular material clog the pores of the filter or press cloth so that little or no pasage of liquid can take place. If any juice is obtained, it still contains so much suspended matter that if it is evaporated sufficiently to be self-preserving, it will solidify in the evaporator. Further, the filter or press cake obtained thereby still contains so much sugars that if it is introduced into a dryer such as a rotary kiln dryer, it forms a taffy-like mass which sticks to the walls of the dryer or forms lumps or balls which do not dry properly. If the waste is finely ground and subjected to filtration or pressing, the entire waste will pass through the filter or press cloth and no separation whatever will be achieved.

In general according to the present invention, the waste cantaloupes are ground to form a puree and a neutral, soluble calcium salt is mixed therewith. A pH of acid to neutral is established, by addition of suitable chemicals, if necessary, and the mass is heated to a temperature from about 80° C. to about 100° C. The juice and solid components of the mixture are then mechanically separated. The character of the waste is by the process drastically altered. Thus the waste, originally a viscous slimy material, is converted into a suspension of granular particles suspended in clear liquid. The waste in this altered form can be readily mechanically separated into its components as by pressing or filtration, since it does not clog the pores of the press or filter cloth and yields a high-solids content cake plus a clear juice. In essence, my conditioning technique involves incorporating with the waste a small proportion of a neutral calcium salt, adjusting the pH of the mixture if necessary and heating the mixture.

A description of the invention in greater detail follows.

The waste cantaloupes, including skin, seeds, and pulp, are first ground. Any of the conventional devices such as a hammermill or brush mill can be used for this purpose.

The ground material (puree) is then placed in a suitable vessel equipped with an agitator and a heating jacket or heating coils. A small proportion of a neutral, soluble calcium salt is then added and thoroughly incorporated with the puree. For practical purposes calcium chloride is preferred although other neutral, soluble salts such as calcium nitrate or calcium acetate can be used to supply the calcium ions. For best results the calcium salt should be supplied in an amount from about 0.15% to about 0.75, preferably about 0.3–0.4%, based on the weight of puree.

After having incorporated the calcium salt in the puree, the pH of the mixture is determined and adjusted if necessary. Proper conditioning will result in the pH range from about 4 to about 7, preferably about 5.5 to about 6.0. If the mixture is too acid, it can be brought to the proper pH range by addition of sodium hydroxide or other suitable alkaline material from the group of alkali metal and ammonium hydroxides and carbonates. If the mixture is too alkaline, one may add the proper amount of hydrochloric, phosphoric or sulphuric acid to decrease the pH. In many cases, adjustment of pH is not necessary since the natural pH of cantaloupe is around 6 and the addition of calcium chloride depresses the pH to about 5.5 which is within the preferred range.

The sequence of the steps of adding the calcium salt and adjusting pH is not critical. Thus the pH may be adjusted prior to or simultaneously with the incorporation of the calcium salt. Usually, however, it is preferable to add the calcium salt first since its addition may alter the pH. Thus if the pH adjustment step is left to the last, any change caused by addition of the calcium salt can be properly compensated by addition of the suitable acid or alkaline reagent.

The mixture is then heated. For best results, the mixture should be heated up to at least 80° C., i. e., from 80° C. to 100° C. The time of heating is not critical and as long as the material is brought up to the proper temperature and held there for a minute or two the proper physical changes occur. No harm is done by extending the heating time but in the interest of economy it is most expedient to heat for only a few minutes.

The puree at this point has changed in appearance and character thus it has changed from a slimy viscous material to a suspension of granular particles in clear liquid. In this state it can be subjected to filtration or pressing in any of the conventional devices adapted for such purposes and will produce a high solids cake and a clear juice fraction.

The pH range of neutral to acid is a critical factor in the process and leads to several important results, to wit: alteration of the physical state of the puree from a slimy viscous mass to a suspension of granular particles suspended in clear liquid; efficiency of juice and solids separation; production of a filter cake which has good drying properties in that it dries without gumming to form a friable, crumbly dry product which has a tan to light brown color and an attractive fragrance; and production of a light colored (amber to light brown) juice which can be readily decolorized.

Experiments ascertain the effect of applying alkaline conditions during the conditioning treatment show that alkalinity brings about many undesirable effects, namely: the reaction mixture becomes thicker and sticky so that separation of juice from the solids is difficult and inefficient; the filter cake is difficult to dry because it is sticky and gummy and when dried is dark brown to black in color and has an unpleasant empyreumatic odor; the separated juice is dark brown in color.

The following examples demonstrate in more detail the process of this invention.

To eliminate variables in the filtration procedure all the filtrations were performed in a standard manner. Thus the mixture was poured on a suction filter, the suction was applied for 3 minutes. The suction line was then broken, the juice collected and measured and the cake removed for determination of moisture content.

Some of the experimental work presented in the examples (Ex. I, parts A, B, and C and Ex. II, part B) are not illustrative of the invention but are included for the purpose of comparison.

EXAMPLE I

Whole cantaloupes were diced, then ground and screened to produce a smooth puree. A 200-gram sample of puree was thoroughly mixed with 0.64 gram of calcium chloride. The mixture which had a pH of about 5.5 was heated to 90° C. and held at that temperature for three minutes while stirring, then filtered.

This process was repeated several times applying different temperatures. In one experiment the entire procedure was carried out at room temperature (23° C.). In the other cases, the puree-calcium chloride mixture was brought to the stated temperature, held at this temperature for 3 minutes, then filtered.

The results of the entire series of experimnts are as follows:

*Table 1*

| Experiment | Temperature, 0° C. | Yield of juice, percent | Moisture content of filter cake, percent |
|---|---|---|---|
| A | 23 | 33 | 88 |
| B | 40 | 39 | 87 |
| C | 60 | 59.5 | 86 |
| D | 80 | 71 | 83 |
| E | 90 | 78 | 80 |

EXAMPLE II

A. A 200-gram sample of whole cantaloupe puree was thoroughly mixed with 0.74 gram of calcium chloride. The mixture which had a pH of about 5.5 was heated to 80° C. and held at that temperature for three minutes while stirring, then filtered.

B. The above procedure was repeated with the only exception that the calcium chloride was replaced by the stoichiometrically equivalent amount of calcium hydroxide (0.5 gram) which gave the mixture a pH of 9.6.

The results are tabulated below:

*Table 2*

| Experiment | Reagent | Yield of juice, percent | Color of juice | Color of dried filter cake |
|---|---|---|---|---|
| A | Calcim chloride | 71 | pale yellow | tan |
| B | Ca(OH)$_2$ | 59 | brown | dark brown |

Having thus described the invention, I claim:
1. A process for treating waste cantaloupes which comprises grinding the cantaloupes to form a puree, mixing the puree with a neutral, soluble calcium salt, establishing an acid to neutral pH in the mixture, heating the mixture to a temperature range from about 80° C. to about

100° C., then mechanically separating the juice and solid components of the mixture.

2. The process in accordance with claim 1 wherein the calcium salt is calcium chloride.

3. The process in accordance with claim 1 wherein the calcium salt is calcium chloride in a concentration from about 0.15% to about 0.75%, based on the weight of the puree.

4. The process in accordance with claim 1 wherein the calcium salt is calcium chloride in a concentration from about 0.15% to about 0.75%, based on the weight of the puree, and wherein the pH of the mixture is from about 4 to about 7.

5. A process for treating waste cantaloupes which comprises grinding whole cantaloupes to form a puree, mixing the puree with calcium chloride in a concentration from about 0.3% to about 0.4%, based on weight of puree, establishing a pH from about 5.5–6.0 in the mixture, heating the mixture to a temperature from about 80° C. to about 100° C., holding it at this temperature while stirring for several minutes until the viscous slimy mass changes into a suspension of granular particles in clear liquid and mechanically separating the juice and solid components of the mixture.

GEORGE R. VAN ATTA.

REFERENCES CITED

The following references are of record in the file of this patent:

UNITED STATES PATENTS

| Number | Name | Date |
|---|---|---|
| 1,991,242 | Cole et al. | Feb. 12, 1935 |
| 2,215,944 | Vincent | Sept. 24, 1940 |
| 2,455,782 | Kuder | Dec. 7, 1948 |
| 2,536,240 | Vincent | Jan. 2, 1951 |
| 2,548,510 | Neal | Apr. 10, 1951 |